Jan. 26, 1965   B. L. HALLER ETAL   3,167,169
FRUIT ORIENTER
Filed Sept. 18, 1961   4 Sheets-Sheet 1

INVENTORS
BELMONT LEROY HALLER,
LAWRENCE W. WATERS
BY THEIR ATTORNEYS
HARRIS, KIECH, RUSSELL & KERN

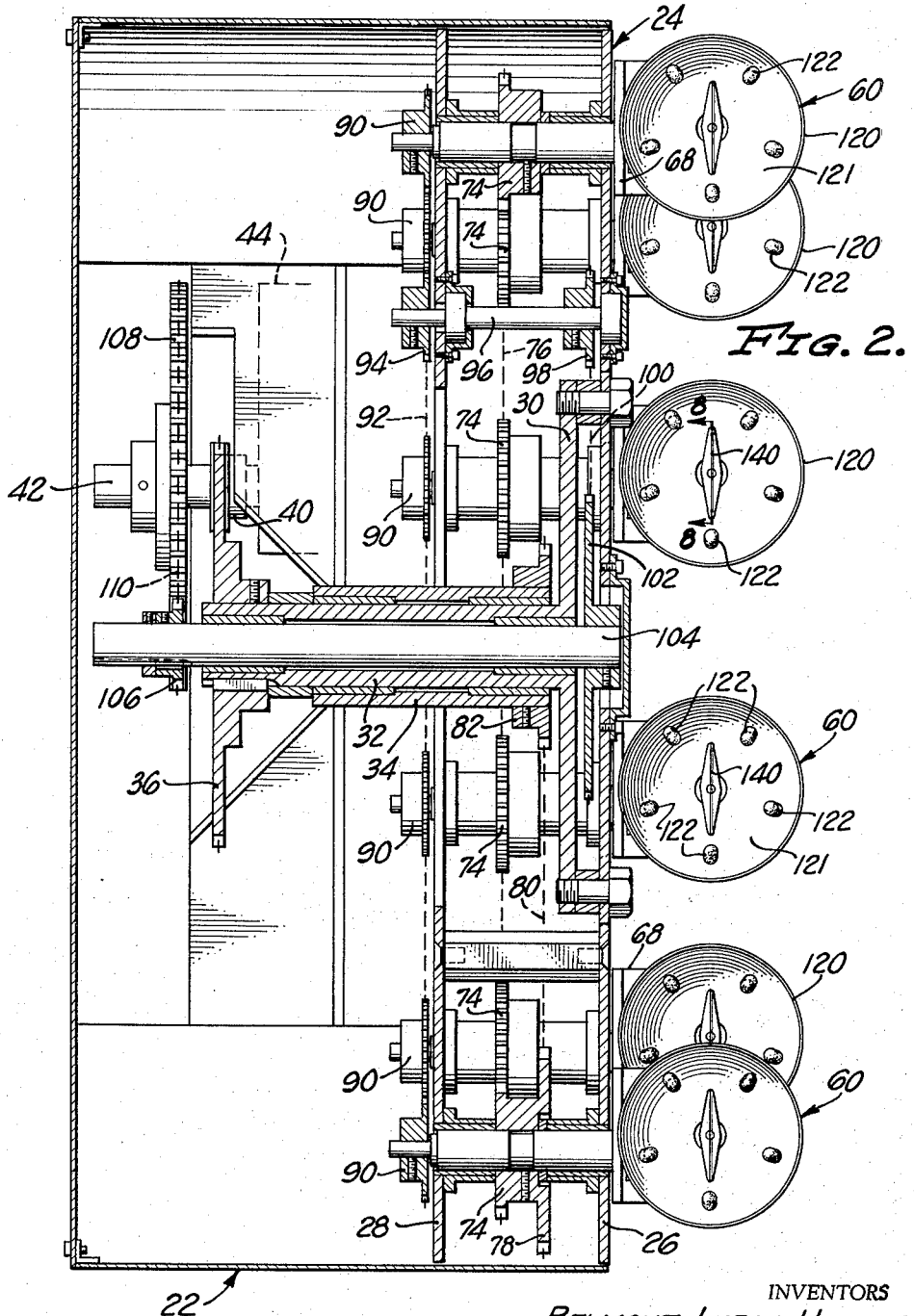

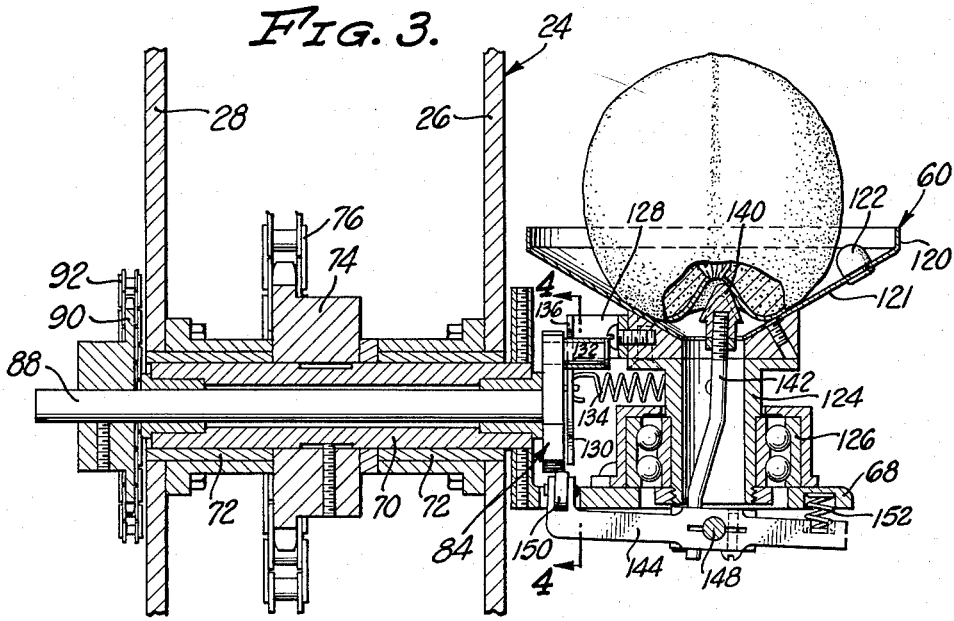
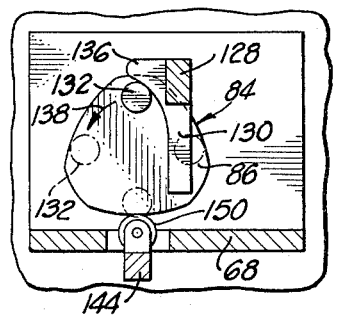
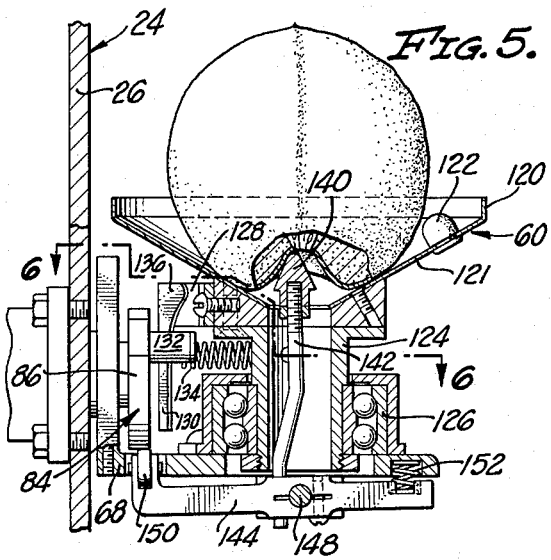
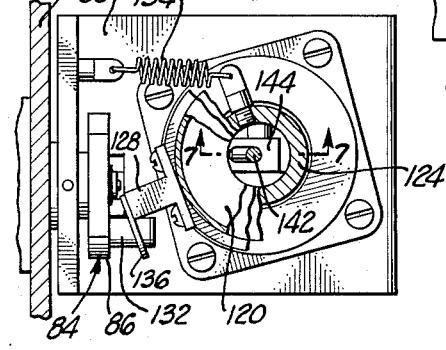

Jan. 26, 1965 B. L. HALLER ETAL 3,167,169
FRUIT ORIENTER
Filed Sept. 18, 1961 4 Sheets-Sheet 4

INVENTORS
BELMONT LEROY HALLER,
LAWRENCE W. WATERS
BY THEIR ATTORNEYS
HARRIS, KIECH, RUSSELL & KERN

United States Patent Office 3,167,169
Patented Jan. 26, 1965

3,167,169
FRUIT ORIENTER
Belmont Leroy Haller, Long Beach, and Lawrence W. Waters, Fullerton, Calif., assignors to Hunt Foods and Industries, Inc., Fullerton, Calif., a corporation of Delaware
Filed Sept. 18, 1961, Ser. No. 138,848
12 Claims. (Cl. 198—33)

The present invention relates to an apparatus for orienting the stem indents and suture planes of indented and sutured fruits so as to insure proper presentation to slicing and pitting equipment. The invention is applicable to any indented and sutured fruits which require predetermined orientations during processing thereof in canneries, or the like, peaches and apricots being examples of such fruits. For convenience, this disclosure will be restricted to peaches, but with the understanding that it is applicable to other fruits having similar structures.

A general object of the invention is to provide an apparatus which will quickly and accurately orient the stem-blossom axes of peaches in a predetermined direction, and the stem indents or cavities and seams or sutures thereof in a predetermined plane.

Another general object is to provide an orienting apparatus which is compact and which thus occupies little floor space in a cannery, or the like.

An important object of the invention is to provide an orienting apparatus which includes a plurality of circumferentially spaced orienting devices mounted on a wheel rotatable about a horizontal axis so as to minimize the amount of floor space required. With this construction, peaches to be oriented are delivered to the orienting devices at one station on the circular path thereof, and are removed, after orientation, at another station on such path.

Another object is to provide means interconnecting the various orienting devices for operating them as they orbit along their circular path of movement.

A further object is to provide means for maintaining the orienting devices upright at all times as they travel along their circular path.

In general, the invention contemplates an orienting device which includes an upwardly facing cup adapted to receive a peach to be oriented, a stem indent finder located within the cup adjacent the bottom thereof and complementary to and insertable into the stem indent of the peach, and means for rotating the peach within the cup until the peach is so oriented that its stem indent fits over the indent finder. When this occurs, the peach is oriented with its stem-blossom axis vertical and with its stem indent and seam or suture in a predetermined plane.

An important object of the invention is to provide an orienting device wherein the peach is rotationally propelled within the cup by oscillatory movement of the cup about its upright axis and combined axial and lateral oscillatory movement of the indent finder within the cup, the oscillatory movement of the cup and the oscillatory movement of the indent finder acting in concert to rotate the peach until the stem indent thereof fits over the indent finder.

A more specific, and important, object of the invention is to provide an orienting device having means for oscillating the cup about its upright axis with a differential action, i.e., for moving the cup at different speeds throughout different portions of each cycle of oscillation thereof. This action, coupled with the described lateral and axial oscillatory action of the indent finder, insures rapid rotation of the peach within the cup until such time as the stem indent of the peach fits over the indent finder.

A further object of the invention is to provide cam means for oscillating the cup about its upright axis with a differential action and for laterally and axially oscillating the indent finder.

Still another object is to provide a cam means for differentially oscillating the cup about its upright axis which includes a cam having an eccentric pin thereon and which includes a cam follower engagable with the eccentric pin and having an offset portion engagable with the eccentric pin during a portion of each revolution of the cam, such offset portion producing a different speed of movement of the cup about its upright axis.

Yet another object of the invention is to provide means for laterally and axially oscillating the indent finder which includes a rocker carrying the indent finder and engaging the cam mentioned, the indent finder being mounted on the rocker at a point spaced from the pivot of the rocket so that the desired combined lateral and axial oscillatory movement of the indent finder is produced.

A further object is to provide an orienting device wherein the aforementioned cam is mounted on an inner shaft rotatable within a tubular outer shaft which carries a support for the cup and indent finder. With this construction, the inner shaft is connected to the means for actuating the orienting means of the various orienting devices, and the tubular outer shaft is connected to the means for maintaining the various orienting devices upright as the wheel on which they are mounted rotates.

The foregoing objects, advantages, features and results of the present invention, together with various other objects, advantages, features and results thereof which will be evident to those skilled in the art to which the invention relates in the light of this disclosure, may be achieved with the exemplary embodiment of the invention described in detail hereinafter and illustrated in the accompanying drawings, in which:

FIG. 2 is an enlarged horizontal sectional view taken along the arrowed line 2—2 of FIG. 1;

FIG. 3 is an enlarged, fragmentary vertical sectional view taken along the arrowed line 3—3 of FIG. 1;

FIG. 4 is a section view taken along the arrowed line 4—4 of FIG. 3;

FIG. 5 is a view similar to a portion of FIG. 3, but showing various parts in different operating positions;

FIG. 6 is a sectional view taken along the arrowed line 6—6 of FIG. 5;

FIG. 7 is a fragmentary sectional view taken along the arrowed line 7—7 of FIG. 6;

Figure 1:
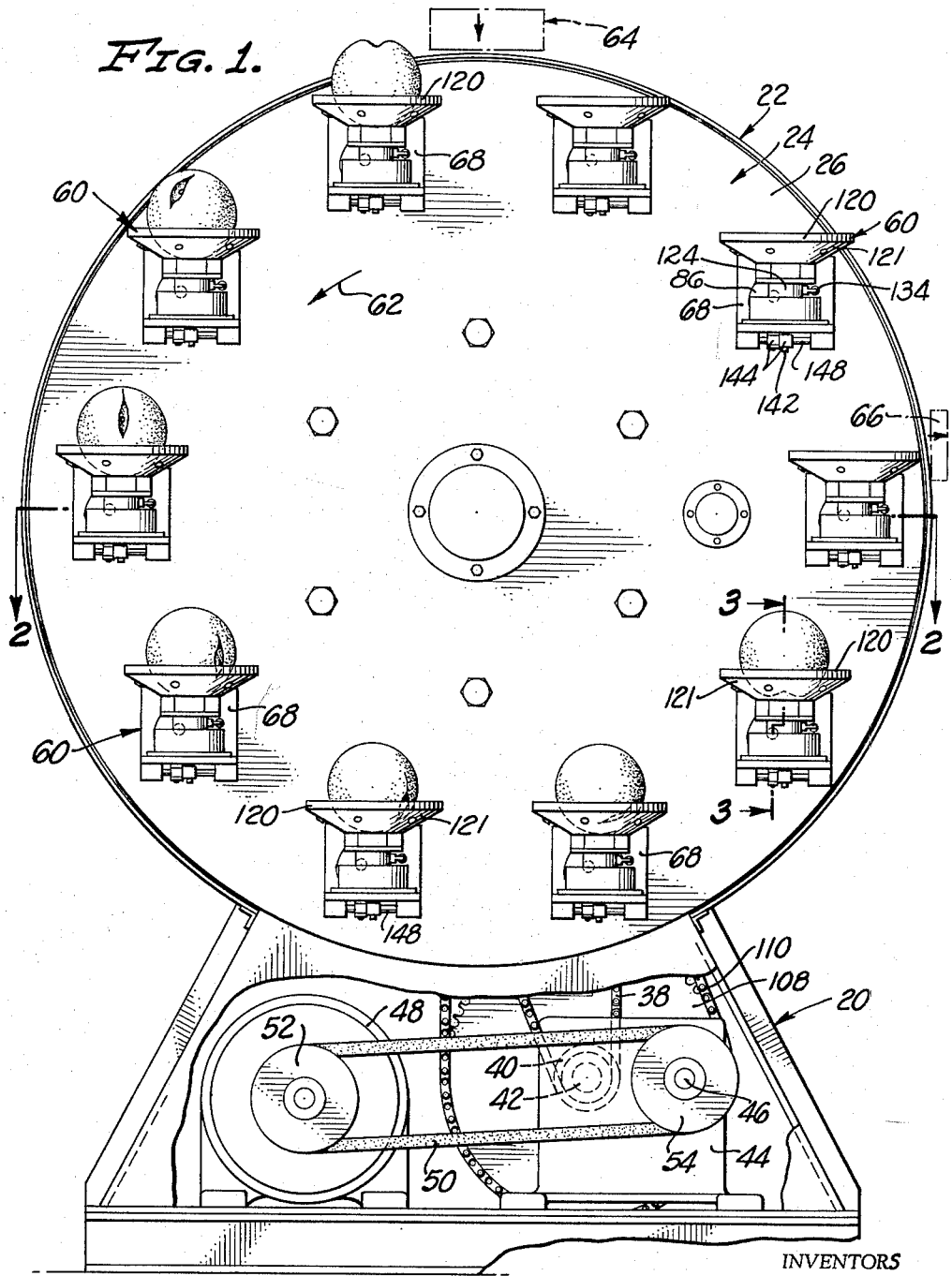
FIG. 1 is a front elevational view of an orienting apparatus which embodies the invention.
Figure 9:
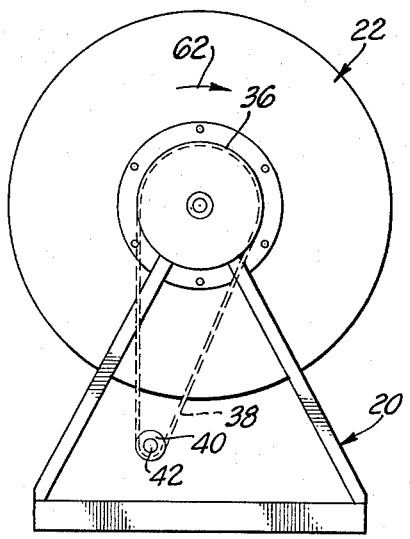
FIGS. 9, 10 and 11 are semidiagrammatic rear elevational views of the orienting apparatus on a reduced scale, and with some components removed, showing in dotted lines various driving means incorporated in the apparatus.

Referring initially to FIGS. 1, 2 and 9 of the drawings, the orienting apparatus of the invention is shown as including a supporting structure or base 20 surmounted by a horizontally-oriented cylindrical housing 22 having an open end which is closed by a rotor or wheel 24 rotatable within the housing about the horizontal axis thereof, as best shown in FIG. 2 of the drawings. The wheel 24 includes axially spaced front and rear discs 26 and 28, the latter being annular, which are interconnected in a manner to be described. The front disc 26 of the wheel 24 is bolted, or otherwise secured, to an annular flange 30 at one end of a tubular outer shaft 32 which is rotatable about the axis of the housing 22 in a bearing 34 carried by the base 20.

At the opposite end of the tubular shaft 32 from the annular flange 30 is a sprocket 36 driven by a chain 38 trained therearound and around a driving sprocket 40 on an output shaft 42 of a gear box 44, all as best shown in FIGS. 2 and 9 of the drawings. Referring to FIG. 1, the gear box 44, which is mounted on the base 20, is provided with an input shaft 46 driven by an electric motor 48 on the base through a belt 50 trained around a pulley 52 on the motor shaft and a pulley 54 on the input shaft 46.

As will be apparent, with the foregoing construction, the motor 48 rotates the wheel 24 about the horizontal axis of rotation of the tubular shaft 32. The diameter ratio of the sprockets 36 and 40, the ratio provided by the gear box 44, and the diameter ratio of the pulleys 52 and 54, are so selected as to provide the wheel 24 with an appropriate rotational speed.

As best shown in FIG. 1 of the drawings, mounted on the front side of the wheel 24 in circumferentially spaced relation are orienting devices or units 60. As the wheel 24 rotates in the direction of the arrow 62, for example, successive ones of the orienting devices 60 respectively receive successive peaches from a suitable input apparatus 64 located at an input station on the orbital path of the orienting devices. The oriented peaches are subsequently removed from the orienting devices 60 by an output apparatus 66 located at an output station on the orbital path. The input and output apparatuses 64 and 66 may be of any suitable constructions, insofar as the present invention is concerned, and will not be considered herein.

As will become apparent, the orienting devices 60 must be maintained upright at all times. The manner in which this is accomplished will now be described, considering for the present only enough of the structure of the orienting devices 60 for the purpose.

As best shown in FIG. 3 of the drawings, each orienting device 60 comprises a support 68 mounted on the forward end of an outer, tubular shaft 70 which is rotatable relative to the wheel 24 about a horizontal axis parallel to and spaced radially outwardly from the axis of rotation of the wheel itself. The tubular shaft 70 associated with each orienting device 60 is rotatable in axially spaced bearings 72, FIG. 3, respectively carried by the discs 26 and 28 forming the wheel 24. Each tubular shaft 70 has a sprocket 74 fixed thereon intermediate its bearings 72.

Figure 10:
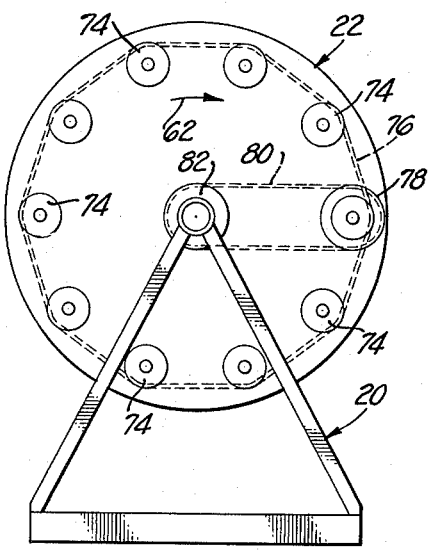

Referring to FIGS. 2 and 10 of the drawings, the sprockets 74 associated with the respective orienting devices 60 have an endless chain 76 trained therearound. Secured to one of the sprockets 74, integrally, or otherwise, is a sprocket 78, FIGS. 2 and 10, having an endless chain 80 trained therearound. The chain 80 is also trained around a fixed sprocket 82 on the bearing 34 for the wheel 24, the sprockets 78 and 82 having the same diameter.

With the foregoing construction, as the wheel 24 is rotated in the manner hereinbefore described, the sprockets 74 are rotated in synchronism with the rotation of the wheel at a rotational speed equal to the rotational speed of the wheel. Consequently, the orienting devices 60 to which the sprockets 74 are connected are maintained upright at all times.

Before considering the orienting devices 60 in detail, the manner in which they are actuated will be described as a matter of convenience. Referring again to FIG. 3 of the drawings, each orienting device 60 is actuated by a cam means 84 comprising a cam 86 fixed on the forward end of an inner shaft 88 which extends through and is rotatable relative to the corresponding outer, tubular shaft 70. The respective inner shafts 88 have fixed on their rearward ends sprockets 90 for rotating the cams 86.

Figure 11:
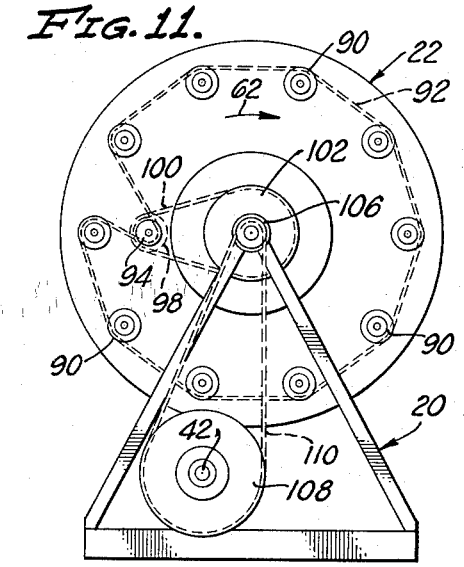

As shown in FIGS. 2 and 11, the sprockets 90 have trained thereover an endless chain 92 which is also trained over an idler sprocket 94 fixed on a shaft 96 rotatable relative to the wheel 24 about an axis parallel to the axis of rotation of the wheel. The idler shaft 96 has fixed thereon another sprocket 98 over which is trained an endless chain 100, the latter also being trained over a sprocket 102. The latter is fixed on the forward end of an inner shaft 104 which extends through and is rotatable in the outer, tubular shaft 32 carrying the wheel 24. The rearward end of the shaft 104 has fixed thereon a sprocket 106 driven by a sprocket 108 on the output shaft 42 of the gear box 44 through an endless chain 110. The various ratios provided by the various components of the drive train just described are so selected as to provide appropriate rotational speeds for the cams 86.

Turning now to a detailed consideration of the orienting devices 60, each, as best shown in FIGS. 3 and 5, includes an upwardly facing cup 120 having a downwardly convergent wall 121 carrying circumferentially spaced, elastomeric fingers 122 adapted to engage and support a peach. The fingers 122 are preferably merely snapped into corresponding openings in the downwardly convergent wall 121 of the cup 120 so that fingers of various sizes may be used to accommodate peaches of different sizes. The upper surface of the wall 121 is smooth to minimize friction between such upper surface and a peach engaging it.

The cup 120 of each orienting device 60 is mounted on a depending tubular shaft 124 which is oscillatable about an upright axis in a bearing 126 carried by the corresponding support 68. Each cup 120 is oscillated about its upright axis by means of the corresponding cam 86 in a manner that will now be described.

The depending shaft 124 of each orienting device 60 is provided with an arm 128 terminating in a cam follower 130 which engages an eccentric pin 132 on the corresponding cam 86, as best shown in FIG. 4 of the drawings. The cam follower 130 is constantly biased into engagement with the eccentric pin 132 by a tension spring 134, FIG. 6, connected at its ends to the corresponding support 68 and shaft 124.

As best shown in FIG. 4 of the drawings, the cam follower 130 is vertically oriented and is provided at one end with a laterally offset portion 136 engageable with the eccentric pin 132 during a portion of each revolution of the cam 86. With this construction, as the cam 86 rotates, the corresponding cup 120 is oscillated about its upright axis with a differential action. In other words, the cup 120 is moved angularly at different speeds throughout different portions of each cycle of oscillation thereof. For example, and considering FIG. 4 of the drawings, as the eccentric pin 132 moves through one quarter of a revolution in the direction of the arrow 138 from the position shown in solid lines, it moves off the offset portion 136 of the cam follower 130 to permit a relatively large angular movement of the cup 120. During the next two one-quarter revolutions of the cam 86, the eccentric pin 132 remains out of engagement with the offset portion 136 to produce less angular movement of the cup 120. During the final one-quarter revolution of the cam 86, the eccentric pin 132 re-engages the offset portion 136 of the cam follower 130 to produce even less angular movement of the cup 120. Thus, the cup 120 moves at successively different speeds through successive portions of each cycle of oscillation.

Figure 8:
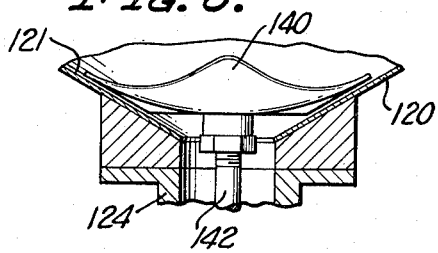
FIG. 8 is an enlarged, fragmentary vertical sectional view taken along the arrowed line 8—8 of FIG. 2.

Within and adjacent the bottom of the cup 120 of each orienting device 60 is a stem indent finder 140 having a configuration complementary to and adapted to fit into the stem indent or cavity of a peach, as shown in FIGS. 3 and 5 of the drawings. As shown in FIG. 8 thereof, each indent finder 140 is elongated in one direction, and converges toward its ends, to fit into the stem indent of a peach, such stem indent being elongated in the plane of the seam or suture of the peach, and being convergent at its ends. Preferably, the indent finder 140 is somewhat smaller than the stem indent or cavity with which it is to be used so that once the desired orientations of the stem-blossom axis and the suture plane of the peach have been achieved, the hereinafter described motion of the indent finder will not disturb the peach.

Each indent finder 140 is mounted on a depending stem 142 which extends downwardly through the corresponding tubular shaft 124. The lower end of each stem 142 is connected to a rocker 144, being adjustably secured thereto by a set screw 146, FIG. 7, to permit vertical adjustment of the position of the indent finder 140 within the cup 120 to accommodate different peach sizes.

Each rocker 144 is connected to the corresponding orienting-device support 68 by a pivot pin 148 perpendicular to and intersected by the upright axis of oscillation of the corresponding cup 120. The corresponding indent-finder stem 142 is connected to the rocker 144 at a point spaced laterally from the pivot pin 148 so that oscillation of the rocker about the axis of the pivot pin results in combined lateral and axial oscillation of the indent finder 140 within the cup 120, the axial component of such oscillation of the indent finder being small, however, as compared to the lateral component.

Each rocker 144 is provided at one end with a roller-type cam follower 150 engaging the periphery of the corresponding cam 86. A compression spring 152 between the corresponding support 68 and rocker 140 constantly biases the cam follower 150 into engagement with the periphery of the cam 86. In the particular construction illustrated, the cam 86 is provided with a three-lobed periphery to produce three oscillations of the corresponding indent finder 140 per cam revolution. However, the number of lobes may be varied. Also, the cam lobes are provided with constant radii at their outer ends to produce intervals of dwell in the oscillatory movement of the indent finder.

Considering the over-all operation of the invention, as the wheel 24 is rotated about its horizontal axis in the manner hereinbefore described, the orienting devices 60 mounted thereon are constantly maintained in upright positions by means of the mechanism desclosed. At the same time, the cams 86 of the orienting devices 60 are rotated to angularly oscillate the cups 120 about their upright axes and to laterally and axially oscillate the indent finders 140 within the cups. Successive peaches to be oriented are delivered to successive ones of the cups 120 in random positions by the input apparatus 64. Subsequently, after orientation thereof, successive peaches are removed from successive ones of the cups 120 by the output apparatus 66.

If a particular peach is deposited in a particular cup 120 in an improperly oriented position, which is likely to be the case, the combined angular oscillation of the cup and lateral and axial oscillation of the corresponding indent finder 140 quickly and accurately revolve the peach within the cup until the stem indent in the peach fits over the indent finder. When this occurs, the peach is, of course, oriented with its stem-blossom axis upright and with its stem indent and suture in a predetermined plane.

More particularly, as each cup 120 is angularly oscillated in a differential manner and as the corresponding indent finder 140 is laterally and axially oscillated, the fingers 122 in the cup and the indent finder, through random frictional engagement thereof with the surface of the peach, quickly revolve the peach within the cup until the stem indent in the peach fits over the indent finder. When this occurs, continued oscillation of the indent finder 140 has no further effect, except perhaps to wiggle the peach slightly in the cup 120, and serves to key the peach in the desired position so that the differential angular oscillation of the cup has no significant further effect. Further, the elastomeric fingers 122 in each cup 120 are so placed and are of such length that they are no longer in contact with the peach when the peach is centered on the indent finder 140, the peach then resting on the downwardly convergent bottom wall 121. After the peach is centered, the cup 120 no longer imparts rotational motion to the peach since the friction forces applied to the bottom of the peach by the bottom wall 121 of the cup will not overcome the inertial resistance of the peach to movement. Thus, once the desired orientation is achieved, it is preserved until the oriented peach is removed by the output apparatus 66.

Although an exemplary embodiment of the invention has been disclosed herein for purposes of illustration, it will be understood that various changes, modifications and substitutions may be incorporated in such embodiment without departing from the spirit of the invention as defined by the claims which follow.

We claim:

1. In a device for orienting the stem indent and suture plane of a peach, or the like, the combination of: a support; an upwardly facing cup carried by said support and oscillatable relative thereto about an upright axis; means connected to said cup for oscillating it about said axis; a stem indent finder carried by said support and located within said cup adjacent the bottom thereof, said cup being oscillatable relative to said indent finder; and means for oscillating said indent finder laterally within said cup.

2. In a device for orienting the stem indent and suture plane of a peach, or the like, the combination of: a support; an upwardly facing cup carried by said support and oscillatable relative thereto about an upright axis; means connected to said cup for oscillating it about said axis at different speeds throughout different portions of each cycle of oscillation; and a stem indent finder carried by said support and located within said cup adjacent the bottom thereof, said cup being oscillatable relative to said indent finder.

3. In a device for orienting the stem indent and suture plane of a peach, or the like, the combination of: a support; an upwardly facing cup carried by said support and oscillatable relative thereto about an upright axis; means connected to said cup for oscillating it about said axis at different speeds throughout different portions of each cycle of oscillation; a stem indent finder carried by said support and located within said cup adjacent the bottom thereof, said cup being oscillatable relative to said indent finder; and means for oscillating said indent finder laterally within said cup.

4. In a device for orienting the stem indent and suture plane of a peach, or the like, the combination of: a support; an upwardly facing cup carried by said support and oscillatable relative thereto about an upright axis; means connected to said cup for oscillating it about said axis at different speeds throughout different portions of each cycle of oscillation; a stem indent finder carried by said support and located within said cup adjacent the bottom thereof, said cup being oscillatable relative to said indent finder; and means for oscillating said indent finder laterally and axially within said cup.

5. In a device for orienting the stem indent and suture plane of a peach, or the like, the combination of: a support; an upwardly facing cup carried by said support and oscillatable relative thereto about an upright axis; means connected to said cup for oscillating it about said axis at different speeds throughout different portions of each cycle of oscillation; a stem indent finder carried by said support and located within said cup adjacent the bottom thereof, said cup being oscillatable relative to said indent finder; and means for oscillating said indent finder laterally and axially within said cup, including a rocker pivotable relative to said support about a horizontal axis perpendicular to said upright axis, means for oscillating said rocker about said horizontal axis, and means mounting said indent finder on said rocker at a point spaced from said horizontal axis.

6. In a device for orienting the stem indent and suture plane of a peach, or the like, the combination of: a support; an upwardly facing cup carried by said support and oscillatable relative thereto about an upright axis; cam means for oscillating said cup about said axis at different speeds throughout different portions of each cycle of oscillation, including a cam having thereon an eccentric pin and including a cam follower connected to said cup and engaging said eccentric pin, said cam follower having an offset portion engageable with said eccentric pin during a portion of each revolution of said cam; and a stem indent finder carried by said support and located within said cup adjacent the bottom thereof, said cup being oscillatable relative to said indent finder.

7. In an apparatus for orienting the stem indents and suture planes of peaches, or the like, the combination of: a supporting structure; a wheel rotatable relative to said supporting structure about a horizontal axis; circumferentially spaced orienting devices mounted on said wheel and rotatable relative thereto about horizontal axes parallel to the axis of rotation of said wheel, each of said orienting devices including an upwardly facing cup and means for orienting the stem indent and suture plane of a peach, or the like, within said cup, each of said orienting means including means for oscillating the corresponding cup about an upright axis and including a stem indent finder within the corresponding cup adjacent the bottom thereof; means interconnecting said orienting devices for rotating same about their axes in synchronism with rotation of said wheel about its axis so as to maintain said cups in upright positions; and means interconnecting said orienting devices for actuating said orienting means thereof.

8. In an apparatus for orienting the stem indents and suture planes of peaches, or the like, the combination of: a supporting structure; a wheel rotatable relative to said supporting structure about a horizontal axis; circumferentially spaced orienting devices mounted on said wheel and rotatable relative thereto about horizontal axes parallel to the axis of rotation of said wheel, each of said orienting devices including an upwardly facing cup and means for orienting the stem indent and suture plane of a peach, or the like, within said cup, each of said orienting means including means for oscillating the corresponding cup about an upright axis, including a stem indent finder within the corresponding cup adjacent the bottom thereof, and including means for oscillating said indent finder laterally relative to the upright axis of the corresponding cup; means interconnecting said orienting devices for rotating same about their axes in synchronism with rotation of said wheel about its axis so as to maintain said cups in upright positions; and means interconnecting said orienting devices for actuating said orienting means thereof.

9. In an apparatus for orienting the stem indents and suture planes of peaches, or the like, the combination of: a supporting structure; a wheel rotatable relative to said supporting structure about a horizontal axis; a tubular shaft rotatable relative to said wheel about a horizontal axis parallel to the axis of rotation of said wheel; means connected to said tubular shaft for rotating it about its axis in synchronism with rotation of said wheel about its axis; a support mounted on said tubular shaft; an upwardly facing cup carried by said support and oscillatable relative thereto about an upright axis; an inner shaft rotatable within and coaxial with said tubular shaft; means for rotating said inner shaft; and means interconnecting said inner shaft and said cup for oscillating said cup about its upright axis.

10. In an apparatus for orienting the stem indents and suture planes of peaches, or the like, the combination of: a supporting structure; a wheel rotatable relative to said supporting structure about a horizontal axis; a tubular shaft rotatable relative to said wheel about a horizontal axis parallel to the axis of rotation of said wheel; means connected to said tubular shaft for rotating it about its axis in synchronism with rotation of said wheel about its axis; a support mounted on said tubular shaft; an upwardly facing cup carried by said support and oscillatable relative thereto about an upright axis; an inner shaft rotatable within and coaxial with said tubular shaft; means for rotating said inner shaft; means interconnecting said inner shaft and said cup for oscillating said cup about its upright axis; a stem indent finder carried by said support and located within said cup adjacent the bottom thereof, said cup being oscillatable relative to said indent finder about its upright axis and said indent finder being laterally oscillatable within said cup; and means interconnecting said inner shaft and said indent finder for laterally oscillating said indent finder within said cup.

11. An orienting apparatus as set forth in claim 10 wherein said means for oscillating said cup and said indent finder include cam means on said inner shaft and cam follower means respectively connected to said cup and said indent finder.

12. An orienting device as set forth in claim 3 wherein said cup is provided on its bottom wall with circumferentially spaced elastomeric fingers, said indent finder and said elastomeric fingers randomly engaging the peach prior to orientation thereof, the length of said elastomeric fingers and the diameter of the circle on which they lie being such that the peach engages the bottom wall of the cup after orientation.

References Cited in the file of this patent
UNITED STATES PATENTS

| | | |
|---|---|---|
| 697,008 | Palmer | Apr. 8, 1902 |
| 2,161,750 | Schonwald | June 6, 1939 |
| 2,969,867 | McClelland | Jan. 31, 1961 |
| 3,064,794 | Anderson | Nov. 20, 1962 |